T. H. RUSHTON & W. DOBSON.
Cotton-Gin Knife-Rollers.
No. 140,218. Patented June 24, 1873.
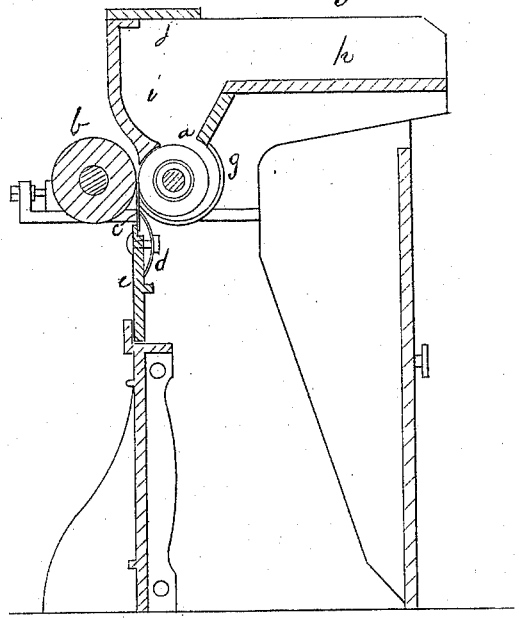
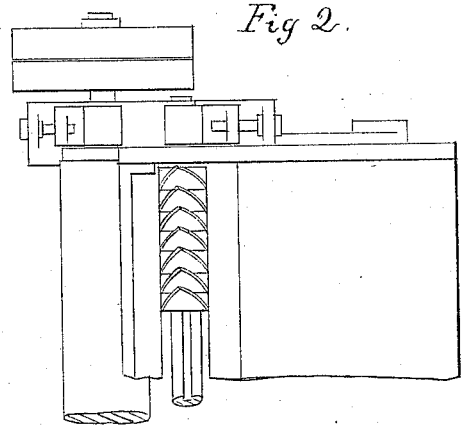
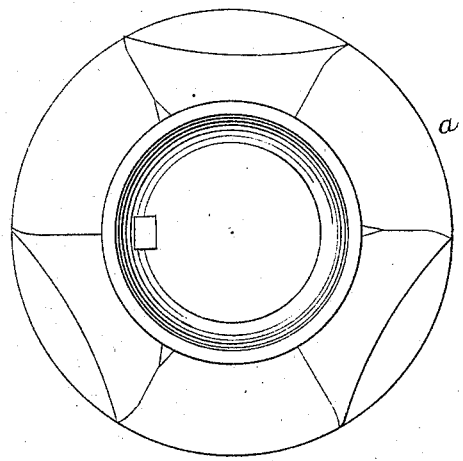
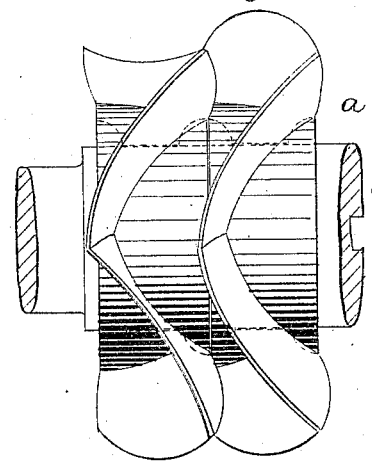
Witnesses:
Solon C. Kemon
Chas. A. Pettit
Inventor:
Thomas H. Rushton
William Dobson
per
Attorneys.

UNITED STATES PATENT OFFICE.

THOMAS H. RUSHTON AND WILLIAM DOBSON, OF BOLTON, ENGLAND.

IMPROVEMENT IN COTTON-GIN KNIFE-ROLLERS.

Specification forming part of Letters Patent No. 140,218, dated June 24, 1873; application filed February 27, 1873.

*To all whom it may concern:*

Be it known that we, THOMAS HENRY RUSHTON and WILLIAM DOBSON, of Bolton, in the county of Lancaster, England, have invented a new and useful Improvement in Machinery for Ginning Cotton; and we do hereby declare the following to be a full, clear, and exact description of the same, reference being had to the accompanying drawings forming part of this specification.

The invention relates to knife-roller cotton-gins and consists in an improvement thereof, as hereinafter described and pointed out in the claim.

Figure 1 is a transverse section; Fig. 2, mainly a plan view of a cotton-gin; and Figs. 3 and 4 represent one end of knife-roller to full size.

*a* represents the knife-roller, which consists of a number of blades connected with an axle by a key. Each blade has two or more angles, the projecting angle of one blade fitting into the angle of its adjacent blade, as shown in Figs. 2 and 4. The alternate angles of the blades are at each end of the roller reduced in diameter, as shown, to prevent the seed from being moved toward framing, while the other angles are of the full diameter so as to move the cotton and seed from framing. This prevents clogging between the ends of roller and framing. *c* is the doctor-knife, placed under roller *a b* and pressed by springs *d*. The knife rests upon a shoulder of cross-beam *e*, the ends of which are secured to the frame sides, and to each end is cast an ear in which is placed a regulating-screw. The knife can be then adjusted without stopping the machine. The roll *a* is partly surrounded by grid *g*, through which passes the seed. The rolls *a b* may be turned by a crossed strap from a drum or drive-shaft.

The seed-cotton to be cleaned is placed on table *h* and dropped into a hopper formed by inclined boards *i* and curved top cross-stay *j*. The fibers pass between it and the doctor-knife and fall under roll *a*, while the seeds are stripped and fall through the grid into the receptacle.

What I claim is—

A cotton-gin knife-roller provided with blades having two or more angles arranged in line with each other in the direction of the shaft, their inclined parts being parallel to each other, as and for the purpose described.

In testimony whereof we have hereunto set our hands before two subscribing witness.

THOMAS HENRY RUSHTON.
WM. DOBSON.

Witnesses:
H. B. BARLOW,
J. W. APPLEBY.